July 9, 1968 A. A. AUSTIN, JR 3,391,802
WORKPIECE EXTRACTOR AND TURNOVER DEVICE
Filed March 4, 1966 5 Sheets-Sheet 1

Albert A. Austin, Jr.
INVENTOR.

July 9, 1968     A. A. AUSTIN, JR     3,391,802
WORKPIECE EXTRACTOR AND TURNOVER DEVICE
Filed March 4, 1966     5 Sheets-Sheet 2

Albert A. Austin, Jr.
INVENTOR.

Albert A. Austin, Jr.
INVENTOR.

July 9, 1968   A. A. AUSTIN, JR   3,391,802
WORKPIECE EXTRACTOR AND TURNOVER DEVICE
Filed March 4, 1966   5 Sheets-Sheet 4

Albert A. Austin, Jr.
INVENTOR.

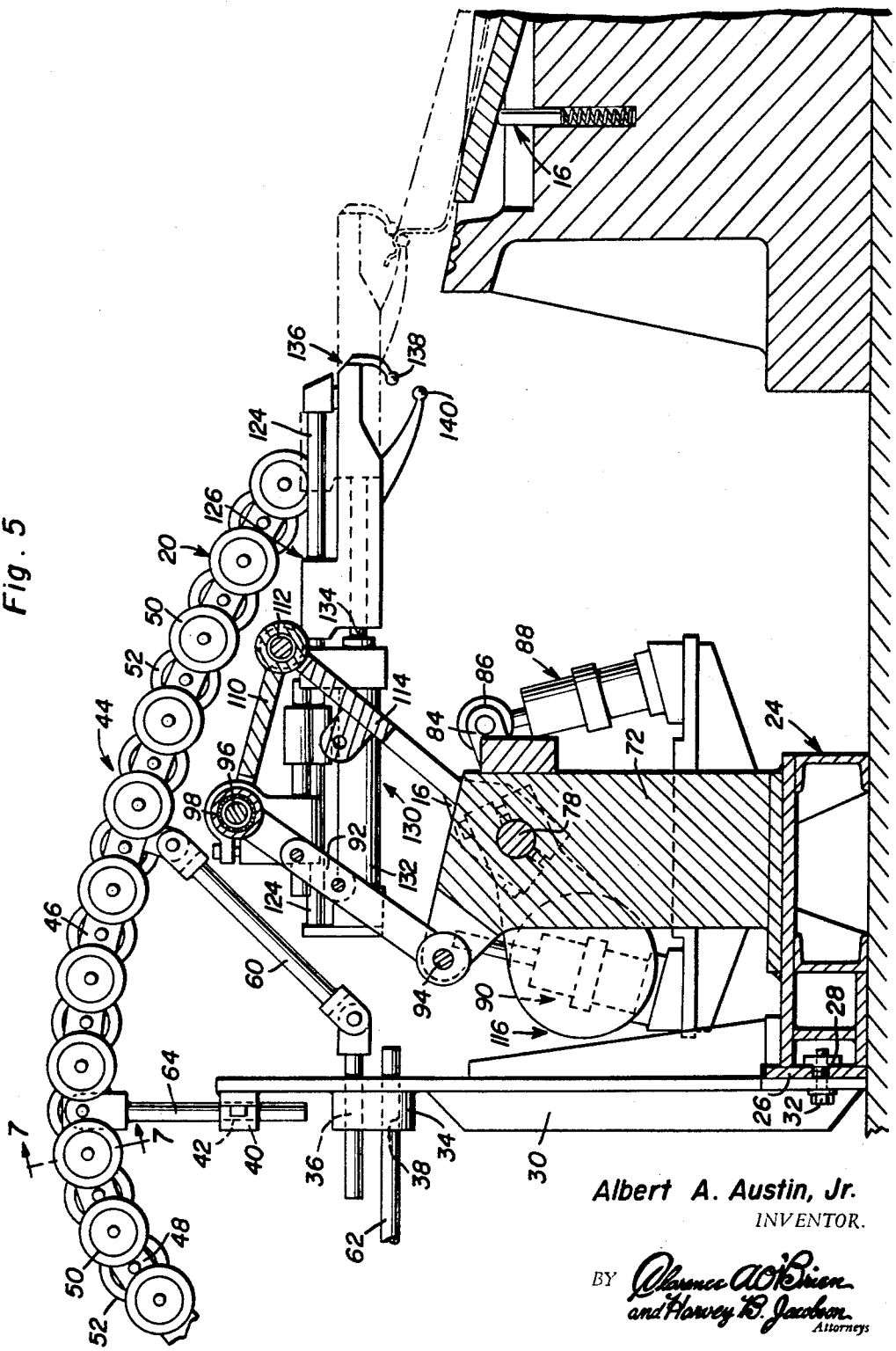

United States Patent Office 3,391,802
Patented July 9, 1968

3,391,802
WORKPIECE EXTRACTOR AND TURNOVER DEVICE
Albert A. Austin, Jr., Grand Blanc, Mich., assignor to General Motors Corporation, Detroit, Mich., a corporation of Delaware
Filed Mar. 4, 1966, Ser. No. 531,875
3 Claims. (Cl. 214—1)

ABSTRACT OF THE DISCLOSURE

A workpiece extractor and turnover device adapted to be positioned adjacent to a stamping press. The device includes means supporting a workpiece gripper for movement between two positions during which time the workpiece gripper is inverted while moving initially along a generally straight inclined path and thereafter along a downwardly curving path.

---

The present invention relates to a press extractor and turnover device and more specifically to an apparatus which is designed to automatically remove a stamped part from a press.

Although there are several types of extractors presently on the market and being utilized in manufacturing plants in an attempt to more fully automate manufacturing processes, the extractors presently in use are inadequate for at least two reasons.

First, most elementary extractors will simply extract the part from the press in a substantially straight line movement and drop it in the rear of the press requiring some other device to pick it up for further processing. Secondly, slightly more advanced extractors will extract the stamped part from the press by lifting the latter through an arc of constant radius and dropping it behind the extractor in an inverted position. Although this type of slightly more advanced extractor is capable of dropping the extracted part on a suitable conveyor for conveying the stamped part to a further point of processing, the difficulty with this type of extractor is that by extracting the part from the press through an arc of movement of constant radius the jaws of the extractor, when the latter returns to pick up the next completed part, return on the same arc of constant radius and interfere with the press requiring either that the press be placed on an extremely slow cycle, remaining open until the extractor can return to its position ready to extract the next piece before it is stamped, or the rear of the press be cut away to provide sufficient clearance for the extractor to assume its position in readiness to extract the next formed part.

The press extractor and turnover device of the instant invention combines the desirable features of the aforementioned previously known types of extractors by providing a means whereby the piece extracted from the press is lifted in an arc and dropped behind the extractor on a conveyor or the like and the jaws of the extractor move through an arc which varies in radius of curvature in a manner such that the initial movement of the part to be extracted is along a substantially straight line portion of the arc having a relatively greater radius of curvature than that of the other end portion of the arc. By the same token, the extractor of the instant invention, when returning to its initial position in readiness to remove the next part formed by the press, moves in reverse along generally the same straight line portion of the arc into its final position for gripping the next part formed by the press. In essence, the extractor of the instant invention moves from its initial position, in readiness to remove a part formed by the press, along a "flat arc" in a generally horizontal direction rather than along an arc of constant radius of curvature and a generally vertical direction and returns to its initial position after dropping the previously formed part in readiness to extract the next formed part along generally the same "flat arc." By this modified movement of the extractor of the instant invention, the cycling speed of the associated press can be more rapid resulting in considerably greater production.

It is accordingly the main object of this invention to provide a press extractor and turnover device which will extract a piece from a press and swing the piece along the aforementioned "flat arc" to an inverted position at a discharge point and which will also swing back to its initial position along substantially the same path in a manner not requiring slow cycling of the associated press or cutting away of the rear of the press and the die to insure that the jaws of the extractor will not interfere with any portion of the press by striking the same.

Another object of this invention is to provide a press extractor and turnover device in accordance with the immediately preceding object and including structural features which will readily adapt the extractor to handle various types of pieces formed by various types of presses.

A final object of this invention to be specifically enumerated herein is to provide a press extractor and turnover device in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a longitudinal vertical sectional view taken substantially upon the plane indicated by the section line 5—5 of FIGURE 4;

FIGURE 6 is an enlarged fragmentary vertical sectional view taken substantially upon a plane indicated by the section line 6—6 of FIGURE 3.

Figure 1:
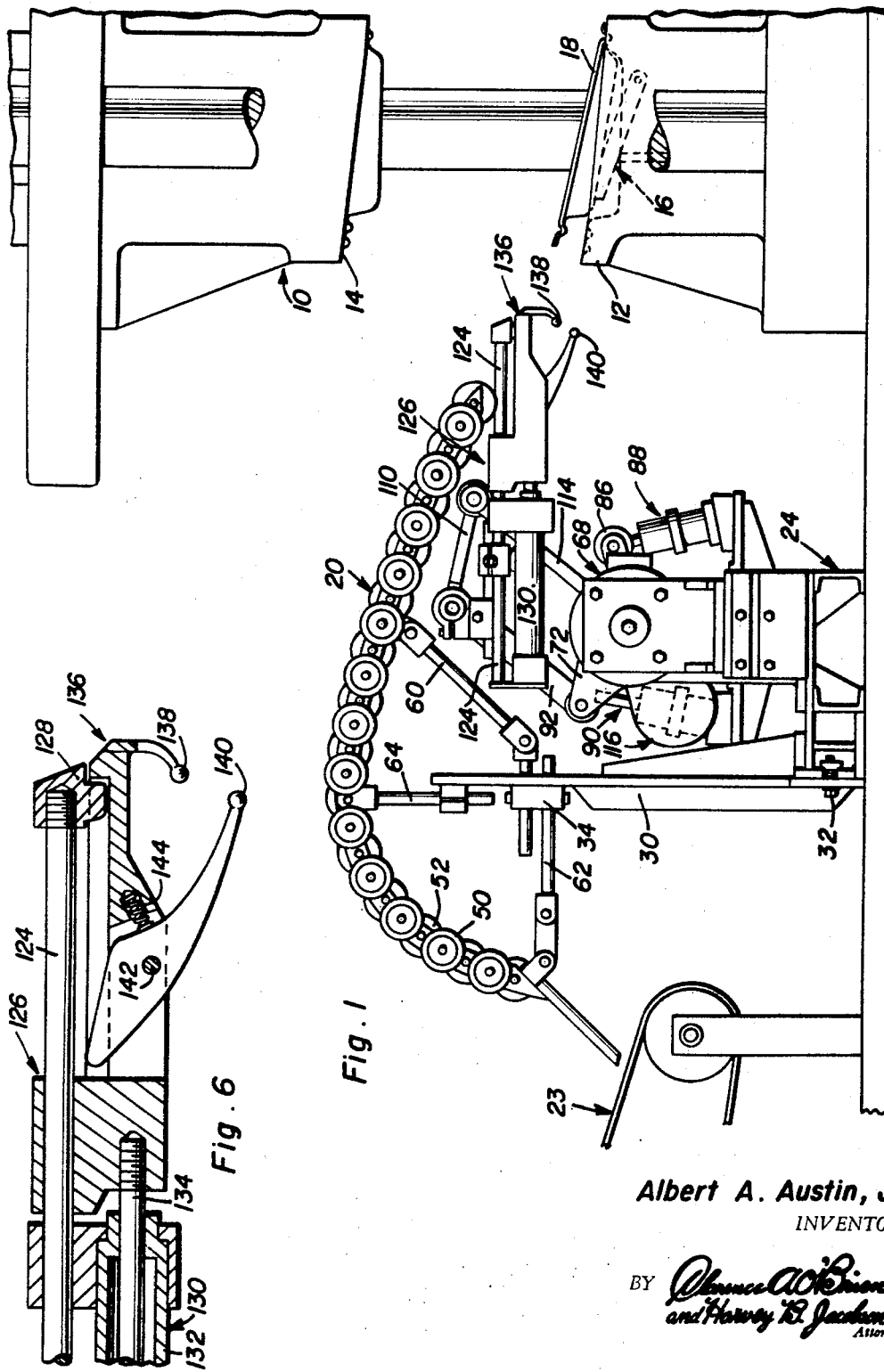
FIGURE 1 is a side elevational view of the press extractor and turnover device of the present invention operatively associated with a press and a conveyor assembly for receiving pieces formed by the press.

Referring now more specifically to the drawings the numeral 10 generally designates a stamping press including a stationary portion 12 and a movable portion 14. The stationary portion 12 defines the female portion of the press and includes an automatic workpiece lifting mechanism generally referred to by the reference numeral 16.

Figure 2:
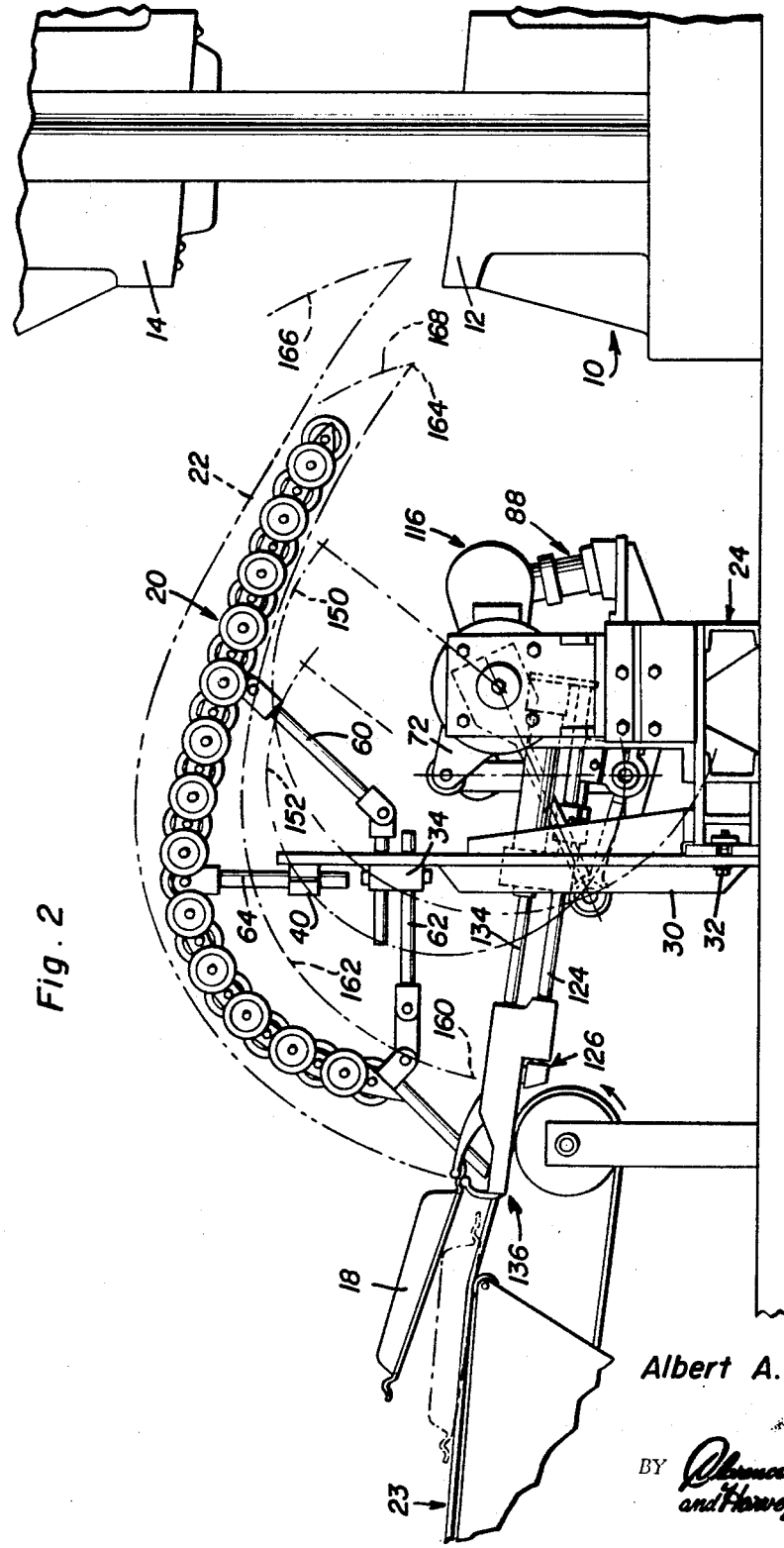
FIGURE 2 is a side elevational view similar to that of FIGURE 1 but illustrating various portions of the press extractor and turnover device in alternate positions.
Figure 3:
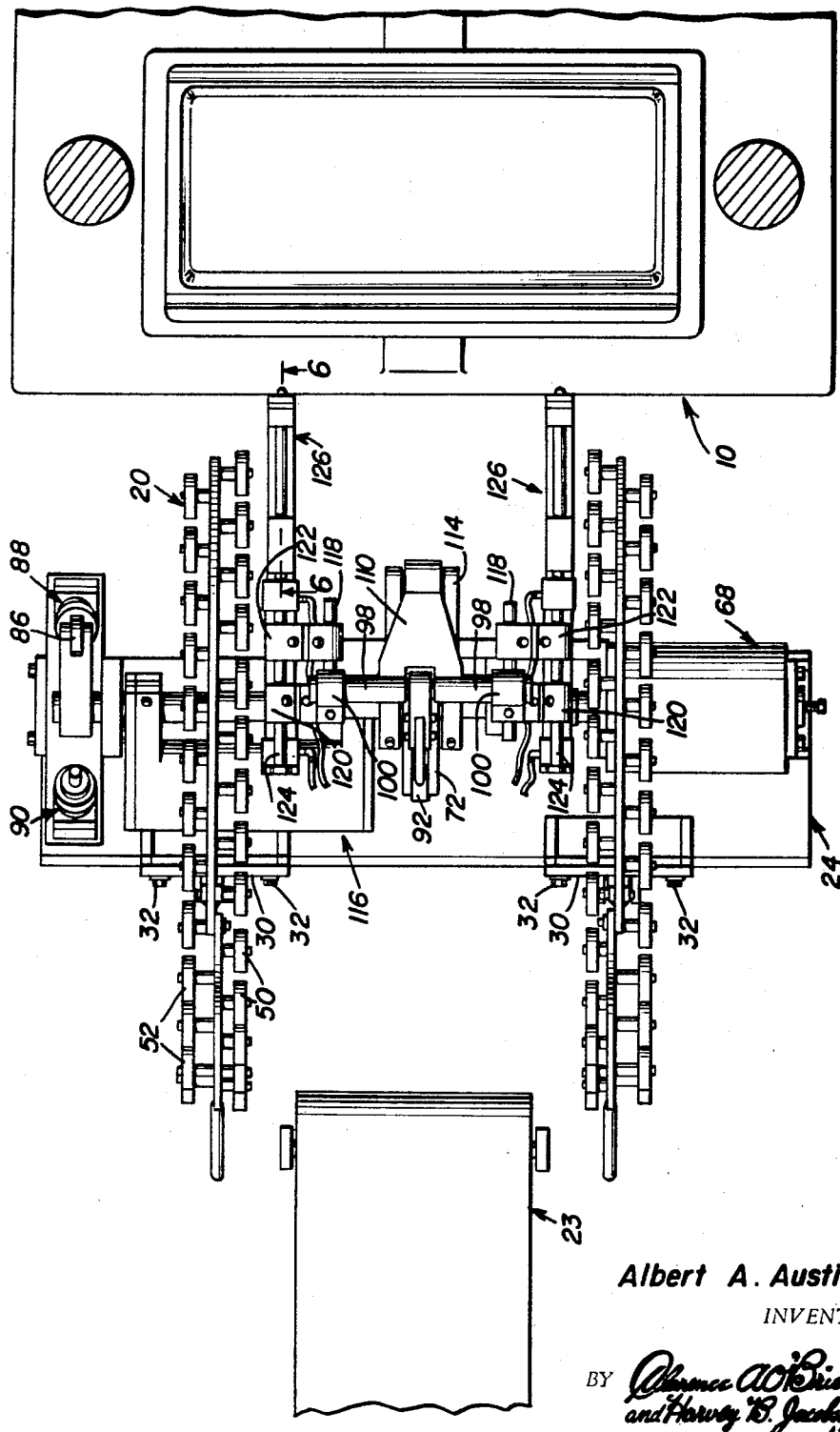
FIGURE 3 is a top plan view of the assemblage illustrated in FIGURE 1.

The workpiece extractor and turnover device of the instant invention is generally referred to by the reference numeral 20 and is utilized to extract each workpiece 18 after it is formed and swing the workpiece through an arc designated by the phantom lines 22 in FIGURE 2 to an inverted position disposed over an endless belt conveyor assembly generally referred to by the reference numeral 23 before releasing the workpiece 18.

The assembly 20 includes a base generally referred to by the reference numeral 24 including a horizontally elongated and upstanding plate 26 having a horizontal slot 28 formed therein. A pair of upright standards 30 are secured to the plate 26 in adjusted positions longitudinally therealong by means of suitable fasteners 32 secured through lower end portions of the standards 30 and the slot 28.

Each standard 30 includes a double clamp assembly 34 having a pair of horizontal bores 36 and 38 formed therethrough and a single clamp assembly 40 having a vertical bore 42 formed therethrough.

Figure 4:
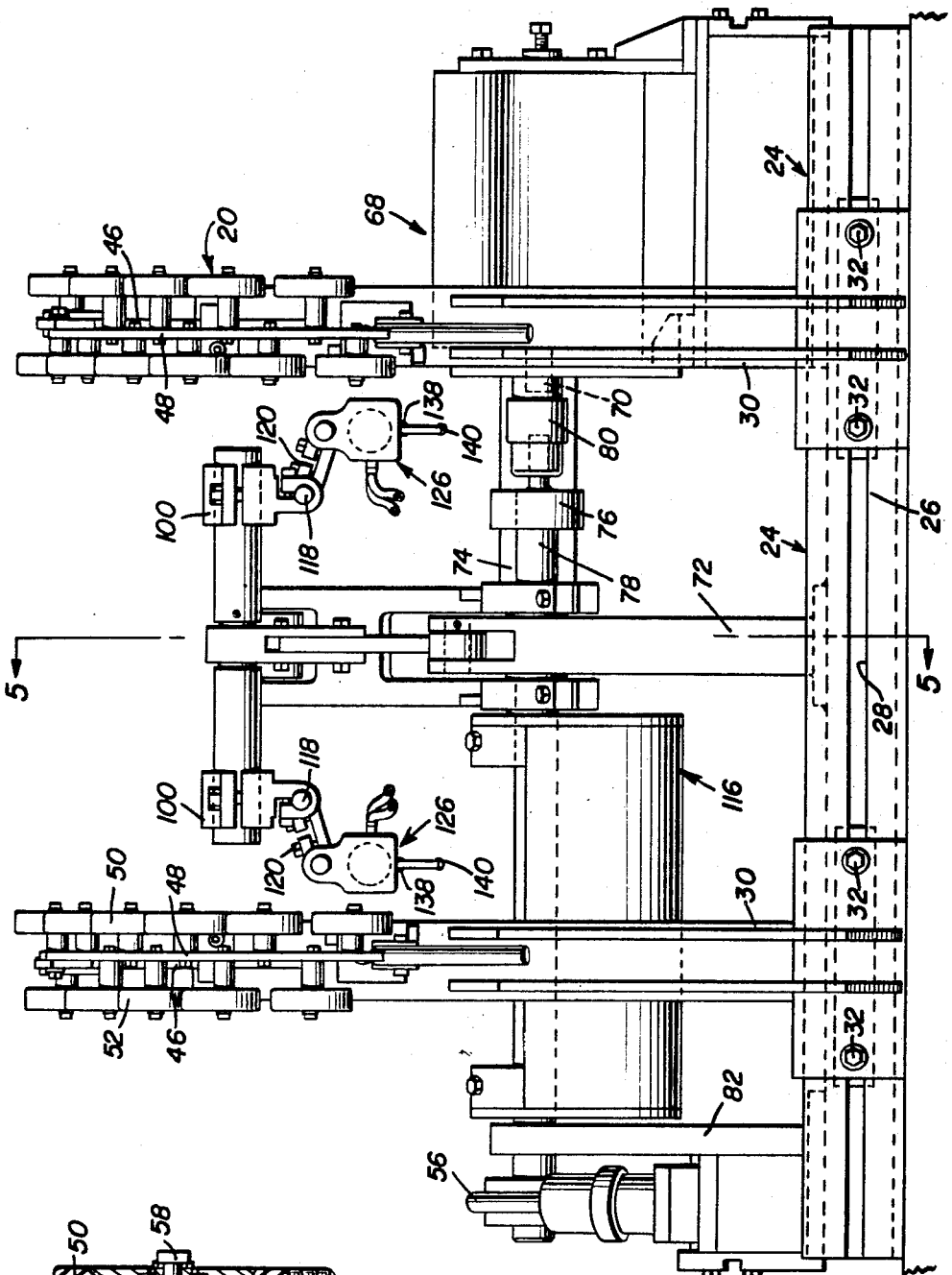
FIGURE 4 is a rear elevational view of the press extractor and turnover device with portions thereof being broken away and shown in vertical section and on somewhat of an enlarged scale.
Figure 7:
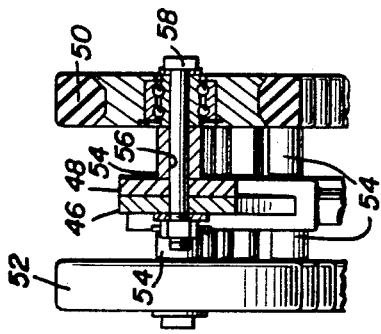
FIGURE 7 is an enlarged fragmentary vertical sectional view taken substantially upon the plane indicated by the section line 7—7 of FIGURE 5.

As seen in FIGURES 4, 5 and 7, a roller support assembly generally referred to by the reference numeral 44 serves as an additional support for the workpiece 18 as it is moved from the press 10 to the conveyor assembly 23. The roller support assembly is supported from each standard 30 and includes a pair of end overlapped arcuate support members 46 and 48. Each of the support members has a plurality of opposite side support rollers 50 and 52 journaled therefrom laterally outwardly projecting stub axle portions 54 and the stub axle portion 54 of the support member 46 adjacent the support member 48 has a longitudinal bore 56 formed therethrough through which a pivot fastener 58 is secured. The pivot fastener 58 is also secured through the adjacent end of the corresponding support member 48 thereby pivotally supporting the adjacent ends of the support members 46 and 48 together.

Referring to FIGURES 2 and 5, the remote end portions of each pair of support members 46 and 48 are supported from the corresponding standard 30 by means of a pair of articulated arm assemblies 60 and 62 pivotally interconnected between the support members 46 and 48 and the corresponding standard 30. The ends of the articulated arm assemblies 60 and 62 remote from the support members 46 and 48 are clampingly secured to the double clamp assembly 34 of the corresponding support member 30.

As seen in FIGURE 4, the press extractor and turnover assembly or device 20 further includes a rotary motor in the form of a Carter rotary actuator generally referred to by the reference numeral 68 including an oscillatable output shaft 70. A center standard 72 is also supported from the base 24 as is the rotary motor 68 and a horizontally disposed brace elevated above the base 74 is secured between the standard 72 and the rotary motor 68 and disposed in generally horizontal alignment with the output shaft 70. A bearing journal 76 is supported from the base 74 and rotatably journals one end portion of a shaft 78. The output shaft 70 is drivingly coupled to the shaft 78 by means of the coupling member 80 and the end of the shaft 78 remote from the output shaft 70 is rotatably journaled from and extends through still another standard 82. The end of the shaft 78 projecting through the standard 82 is provided with a generally radially extending arm 84 seen in FIGURE 5 on whose free end an abutment roller 86 is journaled. A pair of shock absorbing and shaft oscillation limiting assemblies generally referred to by the reference numerals 88 and 90 are also supported from the base 24 and are engageable by the roller 86 to limit rotary movement of the shaft 78 in opposite directions.

A support arm 92 has one end thereof journaled from an upper portion of the standard 72 by means of a pivot shaft or pin 94 and the free end of the support arm 92 rotatably journals a support shaft 96 which extends transversely of the arm 92 and projects from opposite sides thereof. A pair of support sleeves 98 are journaled on the oppositely projecting end portions of the shaft 96 and a pair of clamp assemblies 100 are clampingly secured to the sleeves 98 for adjustable positioning longitudinally therealong.

A connecting arm 110 includes one bifurcated end portion whose furcations are secured to the sleeves 98 and a second end portion rotatably journaled on the mid-portion of a shaft 112. A bifurcated end portion of a power arm 114 has its furcations secured to the opposite ends of the shaft 112 on opposite sides of the connecting arm 110 and the end of the power arm 114 remote from the shaft 112 is also bifurcated and has its furcations 116 clampingly secured to the shaft 78 for rotation therewith. In addition, a counterbalance weight assembly generally referred to by the reference numeral 116 is clampingly supported from the portion of the shaft 78 extending between the standard 72 and the standard 82.

As best seen in FIGURE 4, each of the clamp assemblies 100 clampingly supports one end of a corresponding support shaft 118. Each support shaft 118 has clampingly secured thereto a pair of clamp members 120 and 122 which project outwardly thereof and are clampingly secured at their free ends to a corresponding mounting rod 124 of an elongated workpiece gripping assembly generally referred to by the reference numeral 126. As can best be seen from FIGURES 5 and 6 of the drawings each workpiece gripping assembly 126 has an abutment member 128 threadedly secured to one end of the corresponding mounting rod 124 and includes an extendable fluid motor generally referred to by the reference numeral 130 including a cylinder portion 132 also secured to the corresponding mounting rod 124. The fluid motor 130 also includes a piston rod 134 which is longitudinally reciprocal relative to the cylinder portion 132 upon actuation of the fluid motor 130 and has mounted on the piston rod 134 gripping means referred to generally by the reference numeral 136 and including a first gripping element 138 fixed relative to the piston rod 134 and slidably supported from the mounting rod 124. In addition, each gripping means 136 additionally includes a second gripping element 140 which is pivotally supported from the gripping element 138 by means of a pivot pin 142 and yieldably urged to a first limit position spaced from the gripping element 138 by means of a compression spring 144 operatively connected between the gripping elements 138 and 140.

In operation, the press 10 is actuated after a piece of sheet material of which the workpiece 18 is to be constructed has been placed on the stationary portion 12. Actuation of the press 10 causes the moving or male portion 14 to move downwardly toward the stationary portion 12 for contouring the aforementioned sheet of metal or other material into the finished workpiece 18. Then as the moving portion 14 is raised, the lifting mechanism 16 will automatically be actuated to shift the workpiece 18 to the position illustrated in FIGURE 1 of the drawings ready to be extracted from the press 10. Then, the fluid motors 130 are actuated to extend the gripping means 136 toward the press 10 with the gripping elements 138 and 140 disposed above and below the adjacent marginal edge portion of the workpiece 18. Of course, as the fluid motors 130 are fully extended, the abutment members 128 engage the gripping elements 140 and pivot the latter into closely spaced relation relative to the gripping element 138 whereby the workpiece 18 is gripped by the gripping means 136 in the manner illustrated by phantom lines in FIGURE 5 of the drawings. Then, with the fluid motors 130 remaining fully extended, the rotary motor 68 is actuated to rotate the shaft 78 in a counterclockwise direction as seen in FIGURES 2 and 5 of the drawings whereupon the workpiece 18 will be swung along the arc 22 into the inverted position illustrated in solid lines in FIGURE 2 of the drawings disposed on the side of the press extractor and turnover device 20 remote from the press 10. Thereafter, the fluid motors 130 are retracted so as to enable the gripping elements 140 to move away from the gripping elements 138 thereby releasing the workpiece 18 and allowing the latter to fall downwardly on the conveyor assembly 23 in the position illustrated in phantom lines in FIGURE 2 of the drawings.

With attention now directed more specifically to FIGURES 2 and 5 of the drawings it may be seen that the effective length of the support arm 92 is less than the effective length of the power arm 114 and that the upper extremity of the arc 150 through which the shaft 112 swings upon actuation of the motor 68 is lower than the upper extremity of the arc 152 through which the shaft 96 swings. Therefore, when the rotary motor 68 is actuated to initially swing the workpiece gripping assemblies 126 from the position illustrated in FIGURE 5 of the drawings toward the position illustrated in FIGURE 2, the rear ends of the gripping asemblies 126 are lifted higher than the forward ends thereof whereby the gripping elements 138 and 140 initially move away from the press 10 along the path which is generally straight and inclined upwardly and outwardly from the press 10 relative to a horizontal plane less than 45° as represented by the right hand portion of the arc 22 illustrated in phantom lines in FIGURE 2.

As soon as the arms 92 and 114 have reached substantially vertically disposed positions, inasmuch as the length of the arm 114 is greater than that of the arm 92, the average radius of curvature of the lefthand portion of the arc 22 is considerably less than the average radius of curvature of the right hand portion of the arc 22.

Of course, after the workpiece 18 has been deposited on the conveyor assembly 124 and the motors 130 have been retracted, the rotary motor 68 operates to rotate the shaft 78 in a clockwise direction as viewed in FIGURE 5 of the drawings so as to return the workpiece gripping assemblies 126 to the positions thereof illustrated in FIGURE 5 of the drawings.

As can be seen from FIGURE 2 of the drawings when the gripping means 36 are retracted after releasing the workpiece 18, the gripping elements 138 are disposed at point 160 on the left hand end of the arc 162. Then, as the shaft 78 is rotated in a clockwise direction, the gripping elements 138 swing through the arc 162 to the point 164 at the right hand end thereof. Accordingly, it may be seen that return movement of the gripping means 136 to the positions thereof illustrated in FIGURE 1 of the drawings will not interfere with any portion of the press 10 even though the moving portion 14 may be disposed in its lowermost position. If the gripping means 136 were fixedly supported from a single support arm carried by the shaft 78, the gripping elements 138, during movement away from the press 10, would swing through the arc 166 illustrated in FIGURE 2 of the drawings and of course interfere with portions of the moving portion 14 should the latter be in a somewhat lowered position. In addition, movement of the gripping elements 138 toward point 164 through a true arc would cause the gripping elements to return to point 164 through the arc 168 which could also cause portions of the gripping means 136 to interfere with certain portions of the moving portion 14 of the press 10 when the moving portion 14 is in its lowermost position.

Therefore, since the gripping elements 138 and 140 swing through the arcs 22 and 162, the gripping means 136 do not interfere with the moving portion 14 of the press 10 and there is no need to slow the cycling of the press 10 or to cut away portions of the rear of the moving portion 14 in order to prevent the gripping means 136 from interfering with the moving portion 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A workpiece extractor and turnover device comprising base means adapted to be positioned adjacent a stamping press or the like, upright workpiece gripping means for disposition in a first position adapted to grip a workpiece in said press after it is formed by said press, to support said workpiece therefrom while said gripping means is moved to remove said workpiece from said press to a remove discharge position defined by a second position of said gripping means, and to release said workpiece when in said second position before returning to said first position for gripping another workpiece formed by said press, support means supporting and workpiece gripping means from said base means for movement between said first and second positions, said support means includes means operative to invert said gripping means about a first axis during its movement between said first and second positions, said means operative to invert said gripping means includes mean operative to angularly displace said gripping means about a second axis generally paralleling the first-mentioned axis during its swinging movement between said first and second positions to effect the inverting of said gripping means.

2. A workpiece extractor and turnover device comprising base means adapted to be positioned adjacent a stamping press or the like, upright workpiece gripping means for disposition in a first position adapted to grip a workpiece in said press after it is formed by said press, to support said workpiece therefrom while said gripping means is moved to remove said workpiece from said press to a remove discharge position defined by a second position of said gripping means, and to release said workpiece when in said second position before returning to said first positon for gripping another workpiece formed by said press, support means supporting said workpiece gripping means from said base means for movement between said first and second positions, said support means including means operative during movement of said gripping means from said first position to said second position to cause said gripping means to initially move along a generally straight inclined path and thereafter along a downwardly curving path, during which time the gripping means is inverted.

3. A workpiece extractor and turnover device comprising base means adapted to be positioned adjacent a stamping press or the like, upright workpiece gripping means for disposition in a first position adapted to grip a workpiece in said press after it is formed by said press, to support said workpiece therefrom while said gripping means is moved to remove said workpiece from said press to a remove discharge position defined by a second position of said gripping means, and to release said workpiece when in said second position before returning to said first position for gripping another workpiece formed by said press, support means supporting said workpiece gripping means from said base means for movement between said first and second positions, said support means including a plurality of pivotally interconnected arms arranged as a distorted parallelogram so during movement of the gripping means between the first and second positions said gripping means is inverted while initially moving along a generally straight inclined path and thereafter along a downwardly curving path.

References Cited

UNITED STATES PATENTS

| 1,547,146 | 7/1925 | Peiler. | |
| 2,609,776 | 9/1952 | Sahlin | 214—1 XR |
| 2,653,502 | 9/1953 | Meyer et al. | 214—1 XR |
| 2,948,417 | 8/1960 | Haanes | 214—1 |
| 3,040,685 | 6/1962 | Ridley. | |
| 3,080,983 | 3/1963 | Blatt | 214—1 |
| 3,209,922 | 10/1965 | Melvin | 214—1 |

ROBERT G. SHERIDAN, *Primary Examiner.*

GERALD M. FORLENZA, *Examiner.*

F. E. WERNER, *Assistant Examiner.*